(12) United States Patent
Drewes et al.

(10) Patent No.: US 6,881,993 B2
(45) Date of Patent: Apr. 19, 2005

(54) DEVICE HAVING REDUCED DIFFUSION THROUGH FERROMAGNETIC MATERIALS

(75) Inventors: Joel A. Drewes, Boise, ID (US); Terry Gafron, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 208 days.

(21) Appl. No.: 10/229,139

(22) Filed: Aug. 28, 2002

(65) Prior Publication Data

US 2004/0042246 A1 Mar. 4, 2004

(51) Int. Cl.⁷ ............................................. H01L 31/119
(52) U.S. Cl. ..................................... 257/295; 257/421
(58) Field of Search ................................ 257/295, 421; 438/3

(56) References Cited

U.S. PATENT DOCUMENTS

| | | | | |
|---|---|---|---|---|
| 5,569,617 A | * | 10/1996 | Yeh et al. ........................ 438/3 |
| 5,691,865 A | * | 11/1997 | Johnson et al. .......... 360/324.2 |
| 6,438,026 B1 | * | 8/2002 | Gillies et al. ............... 365/158 |
| 6,532,164 B1 | * | 3/2003 | Redon et al. ................. 365/97 |
| 6,580,270 B1 | * | 6/2003 | Coehoorn ..................... 324/252 |
| 6,633,498 B1 | * | 10/2003 | Engel et al. ................. 365/158 |
| 6,636,436 B1 | * | 10/2003 | Perner ......................... 365/158 |
| 6,677,631 B1 | * | 1/2004 | Drewes ....................... 257/295 |
| 6,710,986 B1 | * | 3/2004 | Sato et al. .............. 360/324.2 |
| 6,714,444 B1 | * | 3/2004 | Huai et al. .................. 365/171 |
| 6,751,074 B1 | * | 6/2004 | Inomata et al. .......... 360/324.2 |
| 6,756,239 B1 | * | 6/2004 | Nickel et al. ................... 438/3 |
| 6,778,433 B1 | * | 8/2004 | Tang ........................... 365/173 |
| 6,795,336 B1 | * | 9/2004 | Kim et al. .................. 365/158 |
| 6,807,091 B1 | * | 10/2004 | Saito ........................... 365/173 |
| 6,816,347 B1 | * | 11/2004 | Koi et al. .............. 360/324.11 |

* cited by examiner

*Primary Examiner*—Michael Lebentritt
(74) *Attorney, Agent, or Firm*—Dickstein Shapiro Morin & Oshinsky LLP

(57) ABSTRACT

A method and apparatus are disclosed for inhibiting diffusion of mobile atoms from an antiferromagnetic layer toward a tunnel oxide layer and through a ferromagnetic layer which is pinned by the antiferromagnetic layer. Diffusion of the mobile atoms is inhibited by an oxide layer provided between the anti-ferromagnetic layer and the ferromagnetic layer. Alternatively, the ferromagnetic layer can have boron atoms located on or in the layer to fill interstices.

42 Claims, 7 Drawing Sheets

DEVICE HAVING REDUCED DIFFUSION THROUGH FERROMAGNETIC MATERIALS

FIELD OF THE INVENTION

The invention relates to an MRAM (magnetic random access memory) cell which inhibits the undesirable diffusion of mobile materials such as manganese.

BACKGROUND OF THE INVENTION

Production of MRAM devices requires high-temperature processing which in some cases can exceed 200° C. During such processing, it is possible for mobile materials such as manganese (Mn) which is used in an antiferromagnetic layer to diffuse along grain boundaries to a tunnel oxide region. Such diffusion lowers reliability and performance of the MRAM device. Consequently, a method for producing MRAM devices which inhibits the diffusion of mobile materials is desired.

BRIEF SUMMARY OF THE INVENTION

In one aspect, the invention provides an MRAM device having upper and lower conducting layers, an anti-ferromagnetic layer connected to the upper conducting layer, a first ferromagnetic layer connected to the anti-ferromagnetic layer, wherein the first ferromagnetic layer is a pinned layer, a tunnel layer connected to the pinned layer; and a second ferromagnetic layer connected to said tunnel layer and to the lower conducting layer, where the second ferromagnetic layer is a free layer and an barrier layer is introduced between the antiferromagnetic layer and the tunnel layer, or introduced within the ferromagnetic layers. In another aspect of the invention, the first and second ferromagnetic layers are infused with boron. In yet another aspect of the invention, a method of fabricating the above components is disclosed.

These and other features and advantages of the invention will be more clearly seen from the following detailed description of the invention which is provided in connection with the accompanying drawings.

DETAILED DESCRIPTION OF THE INVENTION

Figure 1:
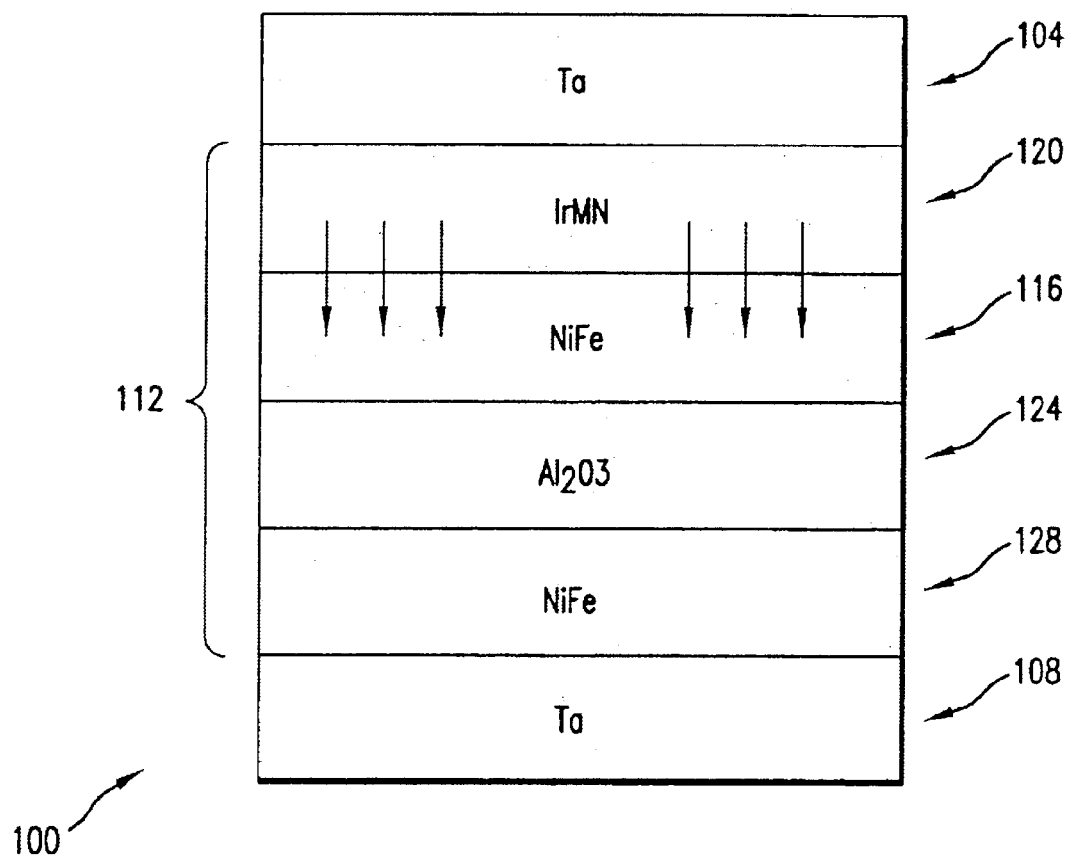
FIG. 1 is a block diagram of a conventional MRAM memory cell.

A conventional MRAM memory cell 100 is shown in FIG. 1, in which a magnetic structure 112 of the cell 100 has upper and lower conduits layers 104 and 108, which are shown as being composed of tantalum (Ta), although other conductive materials may also be used. The magnetic structure 112 includes a ferromagnetic pinned layer 116 which is "pinned" by an anti-ferromagnetic layer 120 in contact with ferromagnetic layer 116. The pinned layer has a magnetic field which is always fixed (or pinned) in a single direction by the anti-ferromagnetic layer 120. The pinned layer 116 is shown in FIG. 1 as being composed of NiFe (Nickel Ferrite); however, it could also be composed of CoFe (Ferrous Cobalt), or CrFe (Chromium Ferrite). An anti-ferromagnetic layer 120 is located near the pinned layer 116. The memory cell 100 also includes a tunnel oxide layer 124, typically formed of aluminum oxide ($Al_2O_3$) in contact with ferromagnetic layer 100 and a second ferromagnetic layer 128 in contrast with the tunnel oxide layer 124. The second ferromagnetic layer can flip, or change magnetic orientation, which is how the memory cell 100 is programmed to store a '1' or a '0' logic state. The resistance of the cell 100 changes depending on the direction of orientation of the ferromagnetic layer 128, which is also known as the 'free' or 'sense' layer. Write currents are applied to the conduction layers 104 and 108 to flip the sense layer 128 to a particular magnetic orientation. The sense layer 128 will hold its orientation until additional write currents are applied, so that the MRAM cell 100 holds a binary value indefinitely, and does not require refresh and is nonvolatile.

When one or more IrMn (iridium manganese) layers are used to pin layer 116, manganese atoms tend to diffuse through the pinned layer 116 to the tunnel region 124 during high temperature processing of a wafer containing memory cell 100. This diffusion, shown by the arrows in FIG. 1, changes the electrical switching characteristics of the MRAM memory cell 100 during a read operation.

Figure 2:
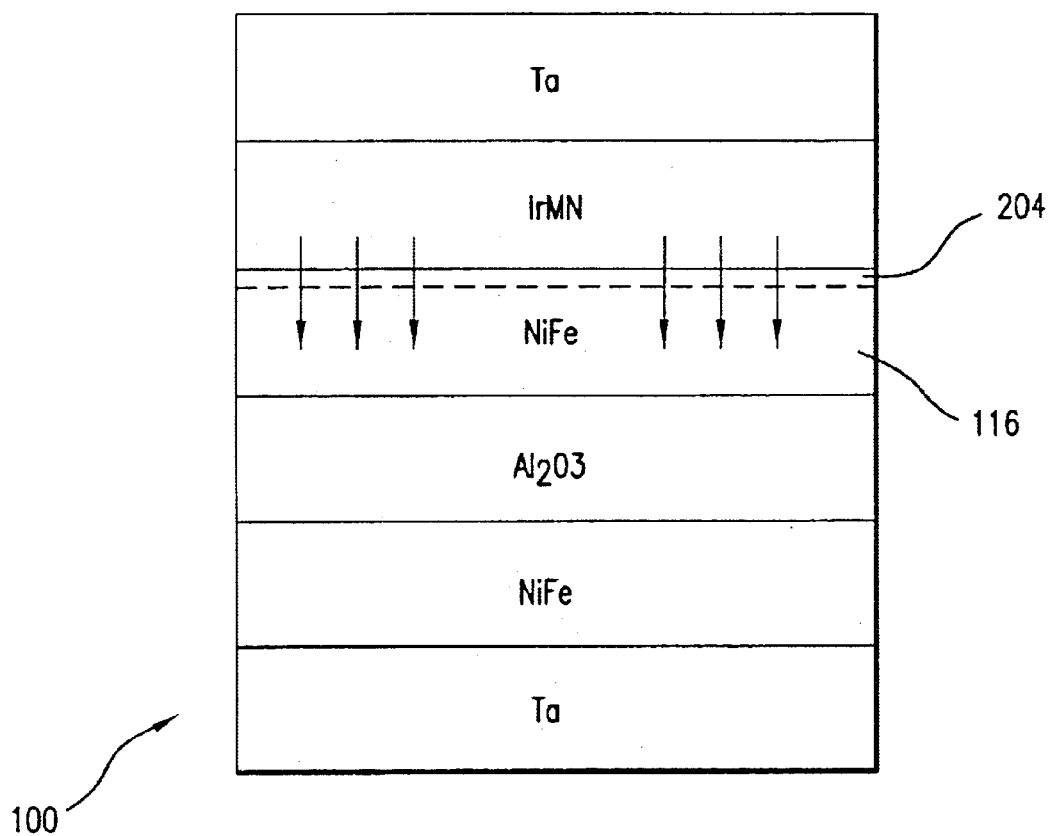
FIG. 2 is a block diagram of an MRAM memory cell of the present invention.
Figure 7:
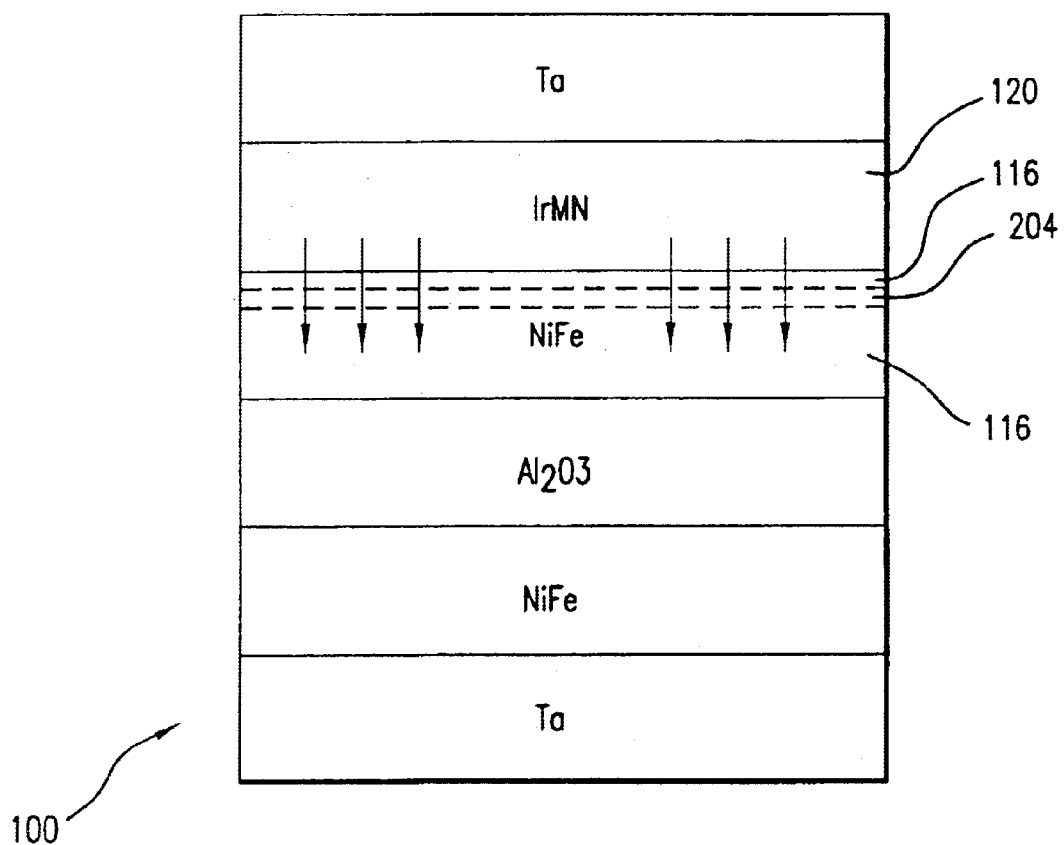
FIG. 7 is a block diagram of an MRAM memory cell of the present invention.

As shown in FIG. 2, a slight oxidation layer 204 is formed on top of the pinning layer 116, which serves as a barrier to mobile Mn atoms. Alternatively, as shown in FIG. 7, a slight oxidation layer 204 may be formed within the pinning layer 116. An oxide layer 204 which is 2–5 Angstroms thick is sufficient to stop the movement of Mn along grain boundaries to the tunnel oxide layer 124. Such an oxide would not need to be uniform in consistency, but should be thin enough so as to not consume too much of the ferromagnetic film 208. Making the oxide 204 too thick will affect the coupling between the pinned layer 116 and the anti-ferromagnetic layer 120. The oxide 204 can be produced from a nickel iron oxide or cobalt iron oxide by either an exposure to oxygen or with the aid of plasma. The antiferromagnetic layer 120 can then be deposited on the thin oxide barrier 204 and provide pinning for the underlying ferromagnetic layer 116.

The advantage of oxidizing the ferromagnetic layer 116 is that such layers will remain ferromagnetic or become slightly antiferromagnetic upon oxidation, and thus will not drastically reduce the coupling of the antiferromagnetic layers with the ferromagnetic layers.

Figure 3:
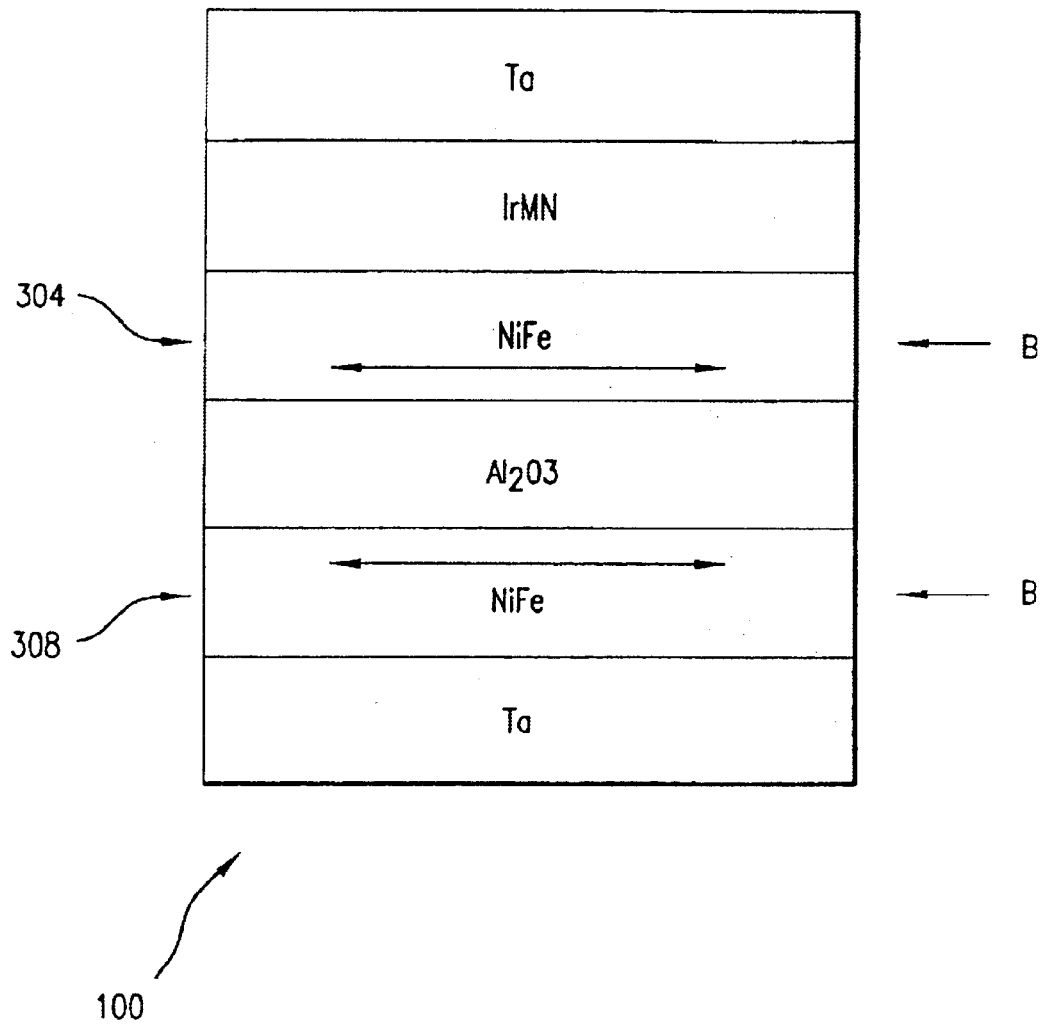
FIG. 3 is a block diagram of a further modification to the MRAM memory cell of FIG. 1.

Another embodiment of the invention is shown in FIG. 3. In this embodiment, the diffusion of Mn along grain boundaries is blocked by materials which are added to the ferromagnetic material and bond to those grain boundaries and thereby effectively plug up the interstices. As shown in FIG. 3, boron (B) is one element that can accomplish such plugging. Boron can be applied to the layer 304 by sputtering, annealing, or by implanting the layer 304 with Boron ions. Boron has the advantage that small amounts can be added to ferromagnetic materials without changing their magnetic behavior. Boron also assists in making the ferromagnetic material amorphous. Consequently, the addition of a thin oxide at the ferromagnetic interface such as the oxide 204 shown in the FIG. 2 embodiment is not necessary.

Because the thin oxide 204 need not be employed, the magnetic coupling between the antiferromagnetic 120 and ferromagnetic 116 layers remains consistent.

Another type of MRAM cell 400 (FIG. 4) uses a Ruthinium layer 408 for "fine-tuning" the magnetic properties of the pinned layer 404. With this structure, exchange coupling between the two ferromagnetic layers 412 and 414 occurs. Through application of the Ru layer 408, the exchange coupling can be adjusted and calibrated. Also, the strong coupling through the Ruthenium forces the ferromagnetic layers 412 and 414 to be antiparallel thus forming an antiferromagnet from the Ruthenium layer 408.

Figure 4:
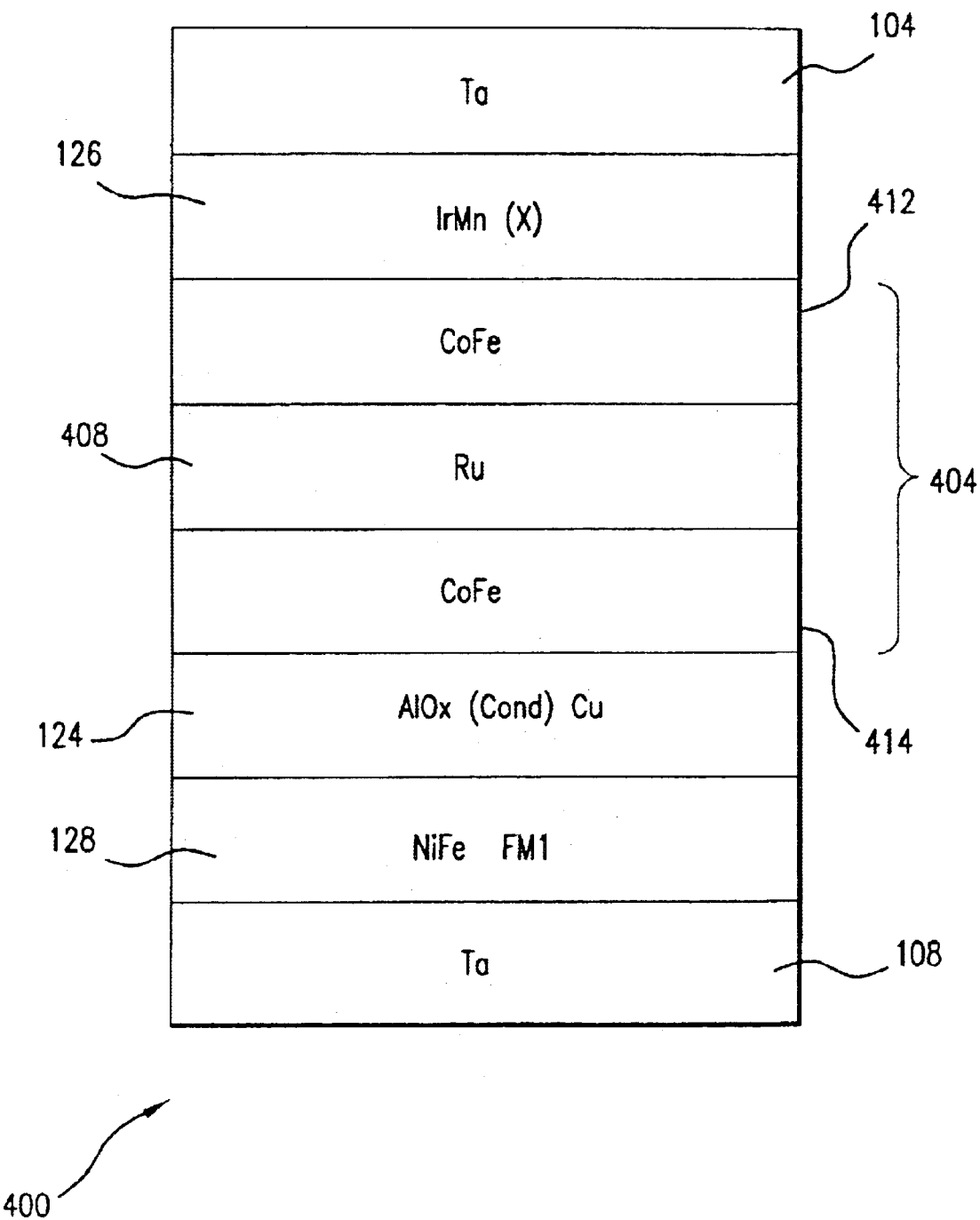
FIG. 4 is a block diagram of another MRAM cell of the present invention.
Figure 5:
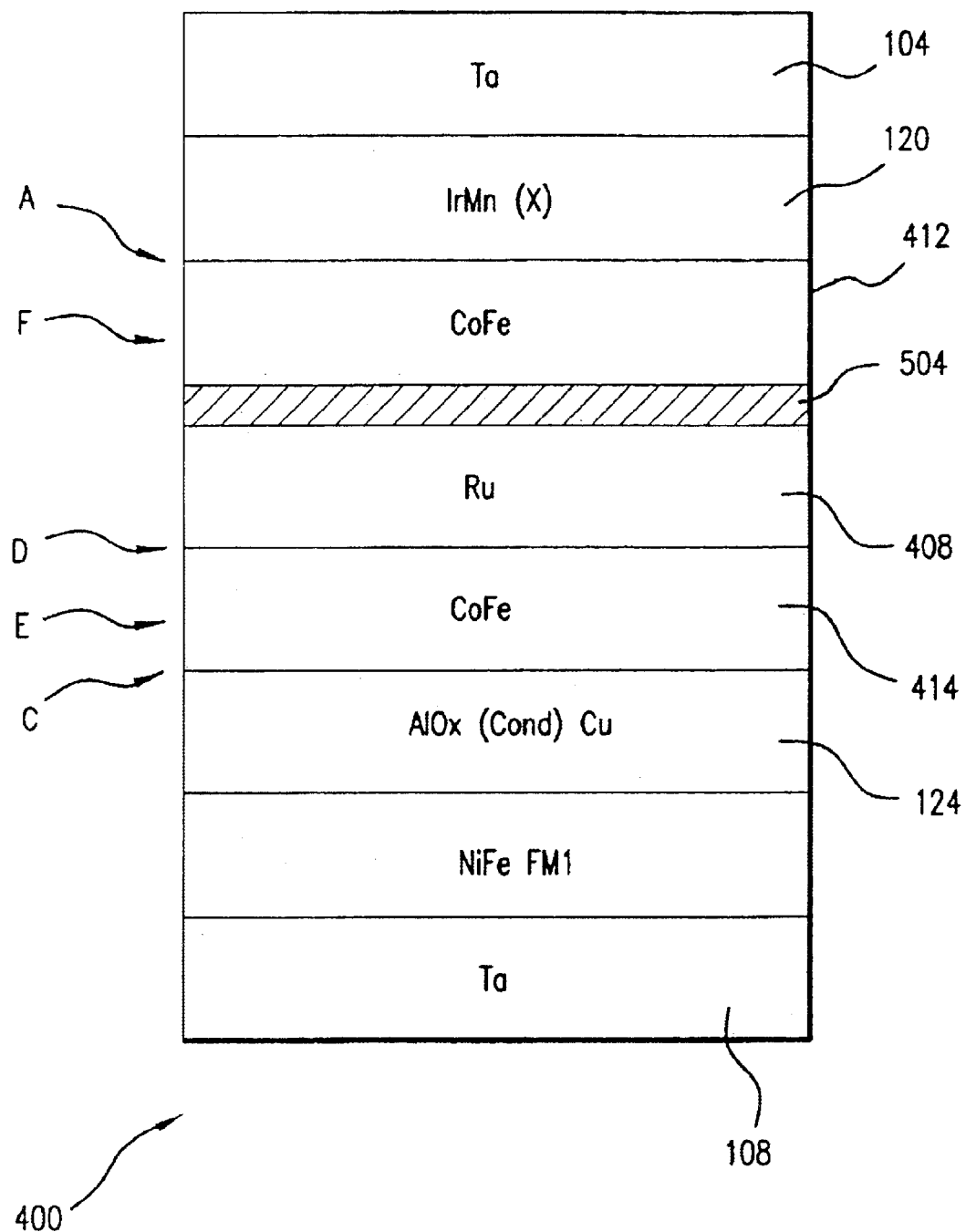
FIG. 5 is a block diagram of a modification to the MRAM cell of FIG. 4.

The oxide layer can also be employed in the FIG. 4 structure, in the manner shown in FIG. 5. Thus, an oxide layer 504 is added to the MRAM cell 400 to inhibit diffusion of Mn atoms toward oxide layer 124. Although FIG. 5 shows the oxide layer 504 being located between the layers 412 and 408, the oxide layer 504 could alternatively be located between layers as shown by arrows A, C, and D. Additionally, the oxide layer could be located within the ferromagnetic layers 412, 414 as shown by the arrows E and F.

Figure 6:
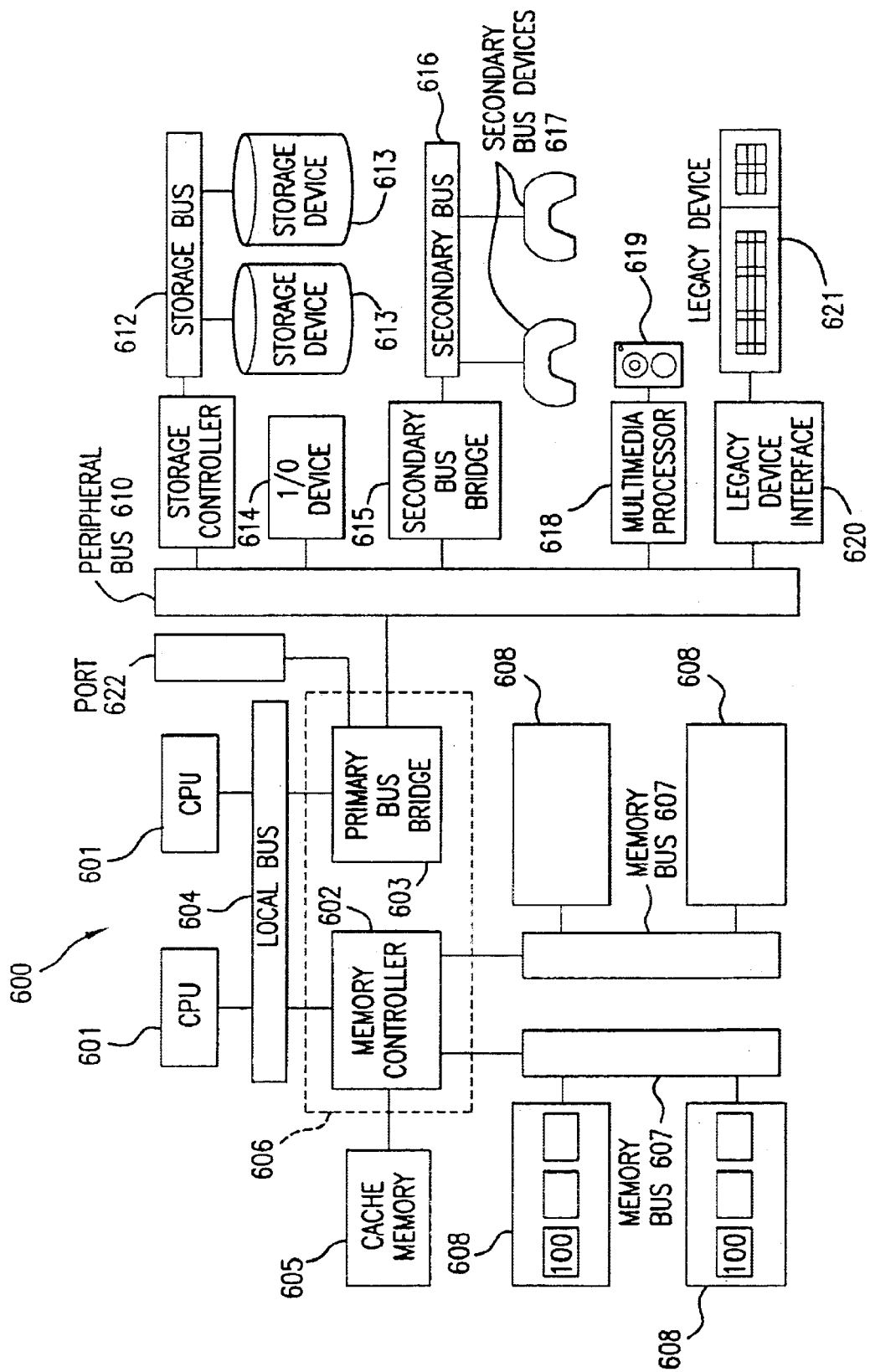
FIG. 6 is a schematic diagram of the present invention employed within a processor circuit.

FIG. 6 illustrates an exemplary processing system 600 which may utilize an electronic device comprising an MRAM device 100 constructed in accordance with any of the embodiments of the present invention disclosed above in connection with FIGS. 2, 3 and 5. The processing system 600 includes one or more processors 601 coupled to a local bus 604. A memory controller 602 and a primary bus bridge 603 are also coupled the local bus 604. The processing system 600 may include multiple memory controllers 602 and/or multiple primary bus bridges 603. The memory controller 602 and the primary bus bridge 603 may be integrated as a single device 606.

The memory controller 602 is also coupled to one or more memory buses 607. Each memory bus accepts memory components 608 which include at least one memory device 610 of the present invention. The memory components 608 may be a memory card or a memory module. Examples of memory modules include single inline memory modules (SIMMs) and dual inline memory modules (DIMMs). The memory components 608 may include one or more additional devices 609. For example, in a SIMM or DIMM, the additional device 609 might be a configuration memory, such as a serial presence detect (SPD) memory. The memory controller 602 may also be coupled to a cache memory 605. The cache memory 605 may be the only cache memory in the processing system. Alternatively, other devices, for example, processors 601 may also include cache memories, which may form a cache hierarchy with cache memory 605. If the processing system 600 include peripherals or controllers which are bus masters or which support direct memory access (DMA), the memory controller 602 may implement a cache coherency protocol. If the memory controller 602 is coupled to a plurality of memory buses 616, each memory bus 616 may be operated in parallel, or different address ranges may be mapped to different memory buses 607.

The primary bus bridge 603 is coupled to at least one peripheral bus 610. Various devices, such as peripherals or additional bus bridges may be coupled to the peripheral bus 610. These devices may include a storage controller 611, an miscellaneous I/O device 614, a secondary bus bridge 615, a multimedia processor 618, and an legacy device interface 620. The primary bus bridge 603 may also be coupled to one or more special purpose high speed ports 622. In a personal computer, for example, the special purpose port might be the Accelerated Graphics Port (AGP), used to couple a high performance video card to the processing system 600. In addition to memory device 631 which may contain a buffer device of the present invention, any other data input device of FIG. 6 may also utilize a buffer device of the present invention including the CPU 601.

The storage controller 611 couples one or more storage devices 613, via a storage bus 612, to the peripheral bus 610. For example, the storage controller 611 may be a SCSI controller and storage devices 613 may be SCSI discs. The I/O device 614 may be any sort of peripheral. For example, the I/O device 614 may be an local area network interface, such as an Ethernet card. The secondary bus bridge may be used to interface additional devices via another bus to the processing system. For example, the secondary bus bridge may be an universal serial port (USB) controller used to couple USB devices 617 via to the processing system 600. The multimedia processor 618 may be a sound card, a video capture card, or any other type of media interface, which may also be coupled to one additional devices such as speakers 619. The legacy device interface 620 is used to couple legacy devices, for example, older styled keyboards and mice, to the processing system 600. In addition to memory device 631 which may contain a buffer device of the invention, any other data input device of FIG. 6 may also utilize a buffer device of the invention, including a CPU 601.

The processing system 600 illustrated in FIG. 6 is only one exemplary processing system with which the invention may be used. While FIG. 6 illustrates a processing architecture especially suitable for a general purpose computer, such as a personal computer or a workstation, it should be recognized that well known modifications can be made to configure the processing system 600 to become more suitable for use in a variety of applications. For example, many electronic devices which require processing may be implemented using a simpler architecture which relies on a CPU 601 coupled to memory components 608 and/or memory buffer devices 304. These electronic devices may include, but are not limited to audio/video processors and recorders, gaming consoles, digital television sets, wired or wireless telephones, navigation devices (including system based on the global positioning system (GPS) and/or inertial navigation), and digital cameras and/or recorders. The modifications may include, for example, elimination of unnecessary components, addition of specialized devices or circuits, and/or integration of a plurality of devices.

What is claimed as new and desired to be protected by Letters Patent of the United States is:

1. A magnetic random access memory device, comprising:
    a first ferromagnetic layer;
    an anti-ferromagnetic layer magnetically coupled to and pinning said first ferromagnetic layer; said anti-ferromagnetic layer containing atoms which may diffuse through said first ferromagnetic layer;
    a second ferromagnetic layer, said second ferromagnetic layer being a free layer;
    a tunnel oxide layer separating said first and second ferromagnetic layers; and
    a barrier material for inhibiting diffusion of said atoms through said first ferromagnetic layer.

2. The device of claim 1, wherein said barrier material comprises
    an oxide layer located between said first ferromagnetic layer and said anti-ferromagnetic layer.

3. The device of claim 1, wherein said barrier material comprises an oxide layer located within said first ferromagnetic layer.

4. The device of claim 2, wherein said oxide layer has a thickness of about 2 A° to about 5 A°.

5. The device of claim 1, wherein said barrier material comprises atoms of boron on or within said first ferromagnetic layer.

6. The device of claim 5, wherein boron atoms fill interstices of said first ferromagnetic layer to prevent diffusion of said atoms through said first ferromagnetic layer.

7. The device of claim 1, wherein said first ferromagnetic layer is divided into first and second sections, with a layer of Ruthinium located therebetween.

8. The device of claim 7, further comprising:
an oxide layer, located between said first section and said anti-ferromagnetic layer.

9. The device of claim 7, further comprising:
an oxide layer, located within said first section.

10. The device of claim 7, further comprising:
an oxide layer, located between said first section and said ruthinium layer.

11. The device of claim 7, further comprising:
an oxide layer, located between said second section and said ruthinium layer.

12. The device of claim 7, further comprising:
an oxide layer, located between said second section and said tunnel oxide layer.

13. A magnetic random access memory device, comprising:
a first ferromagnetic layer;
an anti-ferromagnetic layer magnetically coupled to and pinning said first ferromagnetic layer; said anti-ferromagnetic layer containing atoms which may diffuse through said first ferromagnetic layer;
a second ferromagnetic layer, said second ferromagnetic layer being a free layer;
a tunnel oxide layer separating said first and second ferromagnetic layers; and
a barrier material for inhibiting diffusion of said atoms through said first ferromagnetic layer wherein said barrier material comprises an oxide layer located between said first ferromagnetic layer and said anti-ferromagnetic layer.

14. The device of claim 13, wherein said antiferromagnetic layer comprises iridium manganese.

15. The device of claim 13, wherein said first and second ferromagnetic layers comprise nickel ferrite.

16. The device of claim 13, wherein said first and second ferromagnetic layers comprise ferrous cobalt.

17. A magnetic random access memory device, comprising:
a first ferromagnetic layer;
an anti-ferromagnetic layer magnetically coupled to and pinning said first ferromagnetic layer; said anti-ferromagnetic layer containing atoms which may diffuse through said first ferromagnetic layer;
a second ferromagnetic layer, said second ferromagnetic layer being a free layer;
a tunnel oxide layer separating said first and second ferromagnetic layer; and
a barrier material for inhibiting diffusion of said atoms through said first ferromagnetic layer, wherein said barrier material comprises atoms of boron on or within said first ferromagnetic layer.

18. The device of claim 17, wherein said antiferromagnetic layer comprises iridium manganese.

19. The device of claim 17, wherein said first and second ferromagnetic layers comprise nickel ferrite.

20. The device of claim 17, wherein said first and second ferromagnetic layers comprise ferrous cobalt.

21. A magnetic random access memory device, comprising:
a first ferromagnetic layer divided into first and second sections, with a layer of Ruthinium located therebetween;
an anti-ferromagnetic layer magnetically coupled to and pinning said first ferromagnetic layer; said anti-ferromagnetic layer containing atoms which may diffuse through said first ferromagnetic layer;
a second ferromagnetic layer, said second ferromagnetic layer being a free layer;
a tunnel oxide layer separating said first and second ferromagnetic layers; and
a barrier oxide layer for inhibiting diffusion of said atoms through said first ferromagnetic layer.

22. The device of claim 21, wherein said barrier oxide layer is located between said first section and said anti-ferromagnetic layer.

23. The device of claim 21, wherein said barrier oxide layer is located between within said first section.

24. The device of claim 21, wherein said barrier oxide layer is located between said first section and said ruthinium layer.

25. The device of claim 21, wherein said barrier oxide layer is located between said second section and said ruthinium layer.

26. The device of claim 21, wherein said barrier oxide layer is located within said second section.

27. The device of claim 21, wherein said barrier oxide layer, located between said second section and said tunnel oxide layer.

28. The device of claim 21, wherein said antiferromagnetic layer comprises iridium manganese.

29. The device of claim 21, wherein said first and second ferromagnetic layers comprise nickel ferrite.

30. The device of claim 21, wherein said first and second ferromagnetic layers comprise ferrous cobalt.

31. A processor circuit, comprising
a processor; and
an memory device for exchanging data with said processor;
said memory device comprising at least one magnetic memory cell, said memory cell comprising:
a first ferromagnetic layer;
an anti-ferromagnetic layer magnetically coupled to and pinning said first ferromagnetic layer; said anti-ferromagnetic layer containing atoms which may diffuse through said first ferromagnetic layer;
a second ferromagnetic layer, said second ferromagnetic layer being a free layer;
a tunnel oxide layer separating said first and second ferromagnetic layers; and
a barrier material for inhibiting diffusion of said atoms through said first ferromagnetic layer.

32. The device of claim 31, wherein said barrier material comprises
an oxide layer located between said first ferromagnetic layer and said anti-ferromagnetic layer.

33. The device of claim 32, wherein said oxide layer has a thickness of about 2 A° to about 5 A°.

34. The device of claim 31, wherein said barrier material comprises atoms of boron on or within said first ferromagnetic layer.

35. The device of claim 34, wherein boron atoms fill interstices of said first ferromagnetic layer to prevent diffusion of said atoms through said first ferromagnetic layer.

36. The device of claim 31, wherein said first ferromagnetic layer is divided into first and second sections, with a layer of Ruthinium located therebetween.

37. The device of claim 36, further comprising:

an oxide layer, located between said first section and said anti-ferromagnetic layer.

38. The device of claim 36, further comprising:

an oxide layer, located between said first section and said ruthinium layer.

39. The device of claim 36, further comprising:

an oxide layer, located within said first section.

40. The device of claim 36, further comprising:

an oxide layer, located between said second section and said ruthinium layer.

41. The device of claim 36, further comprising:

an oxide layer, located between said second section and said tunnel oxide layer.

42. The device of claim 36, further comprising:

an oxide layer, located within said second section.

* * * * *

UNITED STATES PATENT AND TRADEMARK OFFICE
CERTIFICATE OF CORRECTION

PATENT NO. : 6,881,993 B2
DATED : April 19, 2005
INVENTOR(S) : Joel A. Drewes et al.

It is certified that error appears in the above-identified patent and that said Letters Patent is hereby corrected as shown below:

Column 1,
Line 31, "an" should read -- a --;

Column 3,
Line 51, "include" should read -- includes --;
Lines 62 and 64, "an" should read -- a --;
Line 65, "also coupled" should read -- also couple --;

Column 4,
Line 16, "an" should read -- a --;
Line 20, "one additional" should read -- additional --;

Column 6,
Line 46, "an" should read -- a --.

Signed and Sealed this

Thirteenth Day of September, 2005

JON W. DUDAS
*Director of the United States Patent and Trademark Office*